United States Patent
Farina

(10) Patent No.: US 9,211,599 B2
(45) Date of Patent: Dec. 15, 2015

(54) GRID FORMING MACHINE FOR MAKING PLATES OF ELECTRIC STORAGE CELLS

(75) Inventor: Pietro Farina, Villafranca (IT)

(73) Assignee: SoVema S.P.A., Verona (IT)

( * ) Notice: Subject to any disclaimer, the term of this patent is extended or adjusted under 35 U.S.C. 154(b) by 244 days.

(21) Appl. No.: 13/824,373

(22) PCT Filed: Sep. 14, 2011

(86) PCT No.: PCT/IB2011/002157
§ 371 (c)(1),
(2), (4) Date: Mar. 17, 2013

(87) PCT Pub. No.: WO2012/038796
PCT Pub. Date: Mar. 29, 2012

(65) Prior Publication Data
US 2013/0174704 A1   Jul. 11, 2013

(30) Foreign Application Priority Data
Sep. 22, 2010  (IT) .............................. PD2010A0282

(51) Int. Cl.
*B23D 25/04* (2006.01)
*B21D 31/04* (2006.01)
(Continued)

(52) U.S. Cl.
CPC ............. *B23D 25/04* (2013.01); *B21D 31/043* (2013.01); *H01M 4/73* (2013.01); *H01M 4/74* (2013.01); *H01M 4/82* (2013.01); *Y10T 83/4757* (2015.04)

(58) Field of Classification Search
CPC ........ B23D 25/04; B23D 25/02; B23D 25/00; B26D 1/56; B26D 1/60; B26D 5/08; B26D 5/12; B26F 1/00; B26F 1/02; Y10T 83/4757; Y10T 83/476; Y10T 83/4763; Y10T 83/465; Y10T 83/485; Y10T 83/49; Y10T 83/494; Y10T 83/498; Y10T 83/50; Y10T 83/501; Y10T 83/9423; Y10T 83/9428; Y10T 83/943; Y10T 83/8821; Y10T 83/8825; Y10T 83/8835; Y10T 83/8837

USPC .................. 83/318–320, 284, 350, 353, 355, 83/356.1–356.3, 684, 686, 687, 613, 616, 83/623, 624
See application file for complete search history.

(56) References Cited

U.S. PATENT DOCUMENTS 3,861,260 A * 1/1975 Kesten et al. ................... 83/328
3,945,097 A   3/1976 Daniels, Jr. et al.
(Continued)

FOREIGN PATENT DOCUMENTS

CN   1263266 C   7/2006
CN   201500730 U   6/2010
(Continued)

*Primary Examiner* — Phong Nguyen
(74) *Attorney, Agent, or Firm* — Mark M. Friedman

(57) ABSTRACT

Grid forming machine for making plates of electric storage cells, which comprises two pressing towers operatively active in succession on a continuous lead band that advances with a substantially constant speed, and each equipped with a framework slidably mounted along the direction of forward movement of the band on the support structure of the machine; with a linear actuator mounted on the framework of the tower and supporting a relative press; and with a matrix fixed to the framework under the linear actuator. The two presses of the two pressing towers are moved cyclically and alternatingly by the linear actuators to move between a raised position and a lowered position, in which they cut the band forming it in the shape of a continuous grid. Moving means are foreseen acting on the pressing towers to move them sliding with a back-and-forth cyclical stroke equipped with at least one operative section with substantially the same speed as that of forward movement of the continuous band, and actuation means to cyclically and alternatingly control the two linear actuators to move the presses from the raised position to the lowered position at the operative section of the cyclical stroke of the corresponding pressing towers.

18 Claims, 9 Drawing Sheets

(51) Int. Cl.
*H01M 4/73* (2006.01)
*H01M 4/74* (2006.01)
*H01M 4/82* (2006.01)

(56) References Cited

U.S. PATENT DOCUMENTS

| | | |
|---|---|---|
| 4,509,581 A | 4/1985 | McCLane et al. |
| 4,544,014 A | 10/1985 | McClane et al. |
| 5,950,513 A * | 9/1999 | Bourakovski ............... 83/318 |
| 6,145,363 A | 11/2000 | Farina |
| 7,117,777 B1 * | 10/2006 | Wilkes ............................ 83/320 |
| 7,497,065 B2 * | 3/2009 | Schiebout et al. ........... 53/371.3 |
| 2005/0103171 A1 * | 5/2005 | Bradbury ......................... 83/13 |
| 2008/0105098 A1 | 5/2008 | Barnes et al. |
| 2010/0180736 A1 * | 7/2010 | Tabanelli ......................... 83/37 |

FOREIGN PATENT DOCUMENTS

| | | |
|---|---|---|
| IT | 1090201 | 6/1985 |
| WO | 01/96043 | 12/2001 |
| WO | 2005/087454 | 9/2005 |
| WO | 2009151022 | 12/2009 |

* cited by examiner

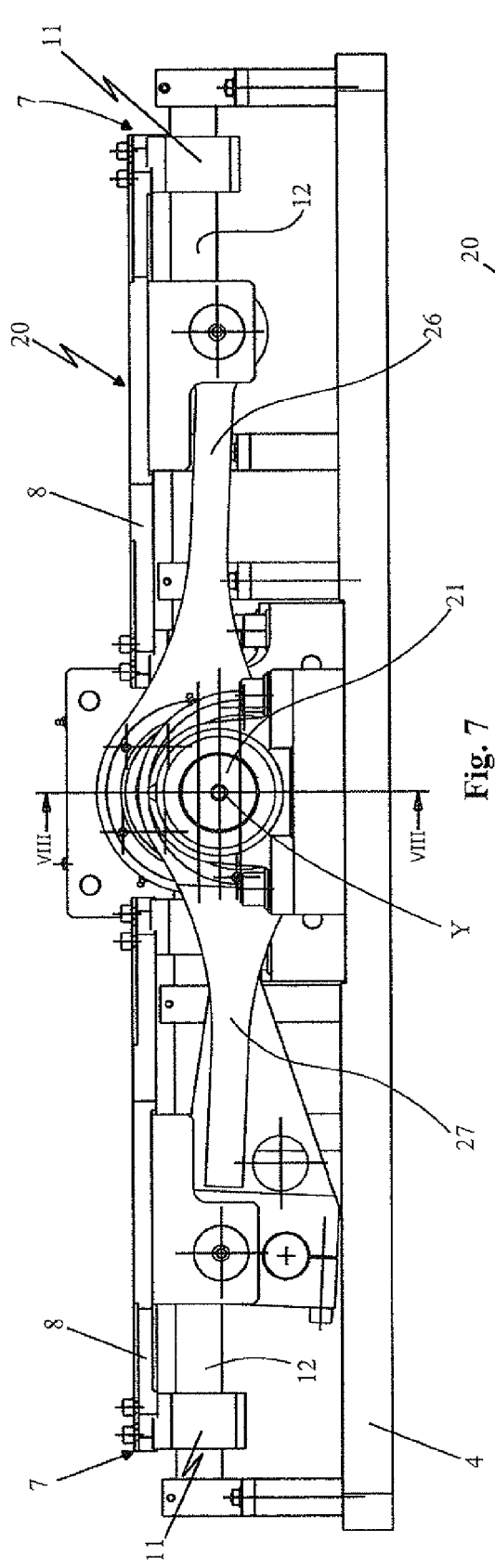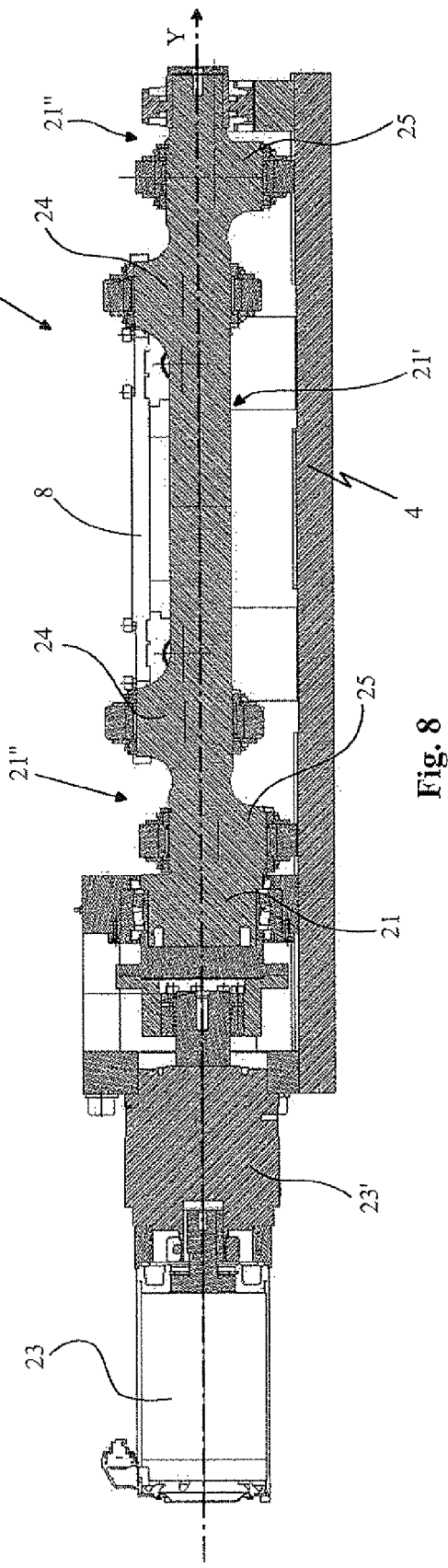
Fig. 7
Fig. 8

GRID FORMING MACHINE FOR MAKING PLATES OF ELECTRIC STORAGE CELLS

FIELD OF APPLICATION

The present invention concerns a grid forming machine for making plates of electric storage cells.

The machine concerned is intended to be advantageously used in production processes of electric storage cells in which, starting from a continuous lead band, a continuous grid is obtained that, when cut into pieces of predetermined length, makes it possible to make the single plates for inserting into the electric storage cells, through successive steps, like for example spreading with a lead oxide-based paste.

STATE OF THE ART

Currently, on the market, machines for forming grids made from lead are common in which it is foreseen to advance a continuous band in successive steps between a press and a matrix where, through punching in succession, the incision and the expansion of the band and the consequent forming of the mesh of the grids takes place.

Machines of this type are described for example in U.S. Pat. No. 3,945,097 and IT 1090201. The press is usually moved by an eccentric, generally actuated by moving means coupled with the supply system of the band, to move vertically along guides to carry out the pressing of the grid through punching in succession.

At each step, the band stops at the pressing area to be cut and expanded by the teeth of the press. Once expansion has occurred, the band advances by a predetermined section to allow the pressing of a subsequent portion of band. Each section of band, intended once cut to form the grid, is incised many times in sequence advancing in steps under the press, through different parts of the press itself, having the teeth arranged in different positions to make all of the meshes of the grid through the aforementioned succession of punching operations.

Machines for forming grids through punching in succession of the known type briefly described above have demonstrated various drawbacks.

One drawback is the fact that the supply in steps of the lead band of these machines does not make it possible to achieve high productivity due to the fact that the speed of forward movement of the band is obviously limited by the limits of mechanical resistance of the lead, which, during the continuous accelerations and decelerations, could stretch and deform.

A further drawback derives from the fact that these machines do not allow the production of grids with a high quality standard. This is due in particular once again to the movement in steps of the band that, by advancing in clicks, introduces imprecision in its positioning in the pressing area.

The production of lead grids with these machines is therefore usually characterised by imprecision in the distribution of meshes that give the grids themselves a quite irregular appearance.

The forward movement in sections of the band also does not allow high productivity of the grid forming machine.

In order to overcome these drawbacks of low efficiency and poor quality, the industrial production of lead grids has thus directed itself towards continuous grid making through different known technologies.

A first technology foresees carrying out the continuous expansion of a lead band through a machine, for example described in U.S. Pat. No. 6,145,363 or WO 01/96043, equipped with very complex kinematisms that allow the press to follow the band with substantially the same speed of forward movement, for the entire incision section.

In greater detail, the press of the machine is moved according to a law of motion equipped with a component oriented along the direction of forward movement of the band and with a component oriented along the direction perpendicular to the direction of forward movement of the band. The first component allows the teeth to advance substantially in synchrony with the band, whereas the second component allows the teeth to cut and expand the band.

This technology makes it possible to obtain much higher productivity with respect to the discontinuous pressing technique, also allowing better quality grids to be produced, with high chemical performance strictly linked to the characteristics of the lead band on which the expansion is carried out.

The aforementioned type of machines for continuously producing grids for electric storage cells, whilst therefore representing progress with respect to the machines advancing in steps quoted earlier, has demonstrated a not yet entirely satisfactory efficiency, allowing the production of a still too small number of grids per hour.

Indeed, with respect to the entire stroke carried out by the press moved by the eccentric, the useful section to cut the band having the middle horizontal component equal to the speed of forward movement of the band, is very short. All of the remaining section of the stroke of the eccentric, and therefore of the press, has the sole purpose of advancing the band and making the press take up the new incision position.

Even if the vertical incision component is very small, the press, having to follow the entire journey of the eccentric, must follow a very long stroke, thus with lots of friction and with the consequent need to carry out its cooling with a suitable system.

A further drawback is the fact that to keep the horizontal component of the speed of the press substantially equal to the speed of forward movement of the band, the trajectory of the stroke of the press is quite flat in the incision step, thus with a fairly modest vertical speed component of the press for the incision of the band. This fact means that in order to manage to extract the teeth of the press from the matrix it is necessary to firmly stop the band through a foreseen piece-remover.

The latter therefore needs to carry out the dual function of allowing the teeth of the press to separate from the cut band coming out from the recesses of the matrix, and of firmly holding the band against the matrix during incision, precisely because, since the incision occurs quite slowly, it allows the lead to deform, saturating all of the possible spaces available to it.

This circumstance usually leads to the constructive difficulty of having to necessarily foresee the movement of the piece-remover as well as of having to provide stopping means of the piece-remover itself, which of course cannot abut with force against the lead band.

In accordance with such a known type of grid forming machine, the press maintains substantially the same speed of forward movement of the band only for the incision section, whereas, at the end of such a section, it undergoes a substantial deceleration in the horizontal direction of its forward movement and a substantial acceleration in the vertical direction of extraction from the matrix.

The press, bound by the aforementioned law of motion, is unable to carry out large expansions of the band, i.e. which involve deep incisions with teeth of substantial height. Indeed, the horizontal deceleration of the press after incision can, coinciding with substantial expansions of the band, lead to the failed detachment of the lead from the teeth of the press.

This circumstance actually limits the operation of this known type of machine to expansions of a modest size.

A further drawback of this last type of machine is that it does not make it possible to simply and cost-effectively vary the thickness of the band to be pressed, or the type of expansion to be carried out and therefore, overall, the shape of the continuous grid that it is wished to obtain.

A second technology for the continuous formation of lead grids (continuous grid casting) is, for example, described in U.S. Pat. No. 4,544,014 and U.S. Pat. No. 4,509,581 and foresees the use of a machine provided with a rotary drum having a plurality of grooves formed on the outer peripheral surface, said grooves being distributed according to the design of the grid that it is wished to make, and on which a molten lead is continuously cast, which once solidified creates a continuous grid.

Such a machine for the continuous production of lead grids allows substantial production speeds to be reached, but it has the main drawback of not allowing, during the solidification of the lead alloy, the formation of an optimal crystalline structure, i.e. one that is spherical, substantially without dendritic formations and with uniformly distributed grains.

Finally, a third technology for the continuous formation of lead grids foresees pressing and expanding a continuous lead band in passing between two counter-rotating rollers, one of which is equipped with teeth and the other is equipped with recesses. Such a machine is, for example, described in U.S. Pat. No. 6,944,942 and WO 2005087454, and in practice it has proven to be incapable of satisfactorily solving both the problem of the extraction of the scrap from the recesses, and the problem of the separation of the grid from the matrix roller carrying the recesses on which it has come to be formed.

Moreover, the grids obtained with this technology are of very poor quality and with the threads of the meshes having a quite irregular shape.

The known machines considered above that foresee the formation of the grid through the expansion of a lead band do not allow a high quality to be achieved, like that which can be more easily ensured by the formation of the grid through punching of the lead band.

DISCLOSURE OF THE INVENTION

In this situation, the problem forming the basis of the present invention is therefore to avoid the drawbacks found in known machines by providing a grid forming machine for making plates of electric storage cells, which allows lead bands to be cut continuously with a substantial production speed.

Another purpose of the present invention is to make a machine that carries out the incision precisely and without the need to move the piece-remover.

Another purpose of the present invention is to make a machine that is mechanically balanced, limiting the transmission outside of it of mechanical vibrations.

Another purpose of the present invention is to make a machine that, being supplied by a continuous band, can be integrated in an optimal manner inside complete lines for the production of plates for electric storage cells.

A further purpose of the present invention is to make a machine that is constructively simple and operatively totally reliable.

A further purpose of the present invention is to make a machine that makes it possible to vary the incision of the band and therefore the shape of the grid produced through simple adjustment operations.

These and yet other purposes are all accomplished by the grid forming machine for making plates of electric storage cells, object of the present invention according to the claims given below.

Thanks to this machine, it is possible to continuously punch lead bands extremely quickly, allowing a high production of grids per hour.

Moreover, such a machine is at the same time constructively simple and operatively totally reliable.

BRIEF DESCRIPTION OF THE DRAWINGS

The technical characteristics of the invention, according to the aforementioned purposes, can be clearly seen from the content of the claims given below and the advantages thereof will become clearer in the following detailed description, made with reference to the attached drawings, which represent an embodiment thereof given as an example and not for limiting purposes, in which:

FIG. 7 shows the machine part of FIG. 5 in a front view;

FIG. 8 shows the machine part of FIG. 5 in a section view carried out along the line VIII-VIII of the same FIG. 7;

DETAILED DESCRIPTION OF A PREFERRED EMBODIMENT

Figure 1:
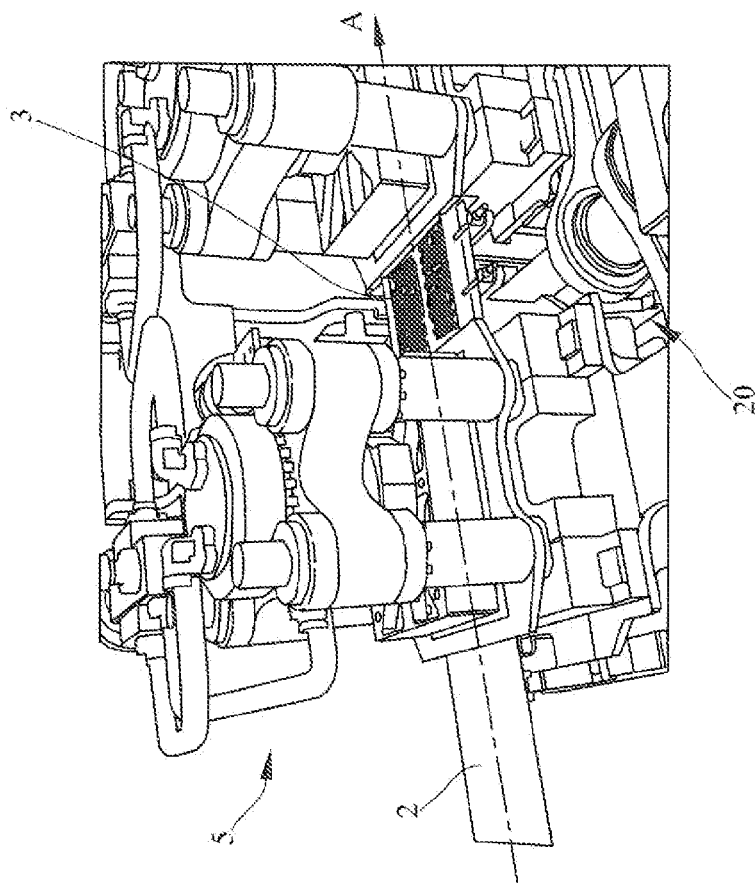
FIG. 1 shows an overall perspective view of the grid forming machine for making plates of electric storage cells, object of the present invention.
Figure 3:
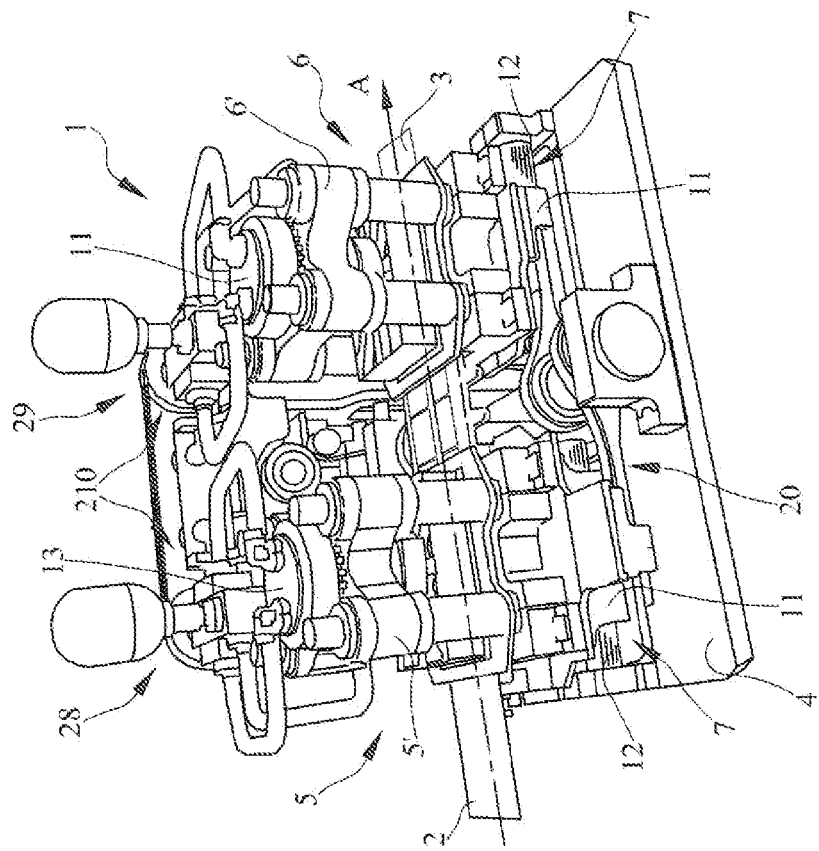
FIG. 3 shows an enlarged detail of the machine of FIG. 1 relative to a pressing tower.
Figure 2:
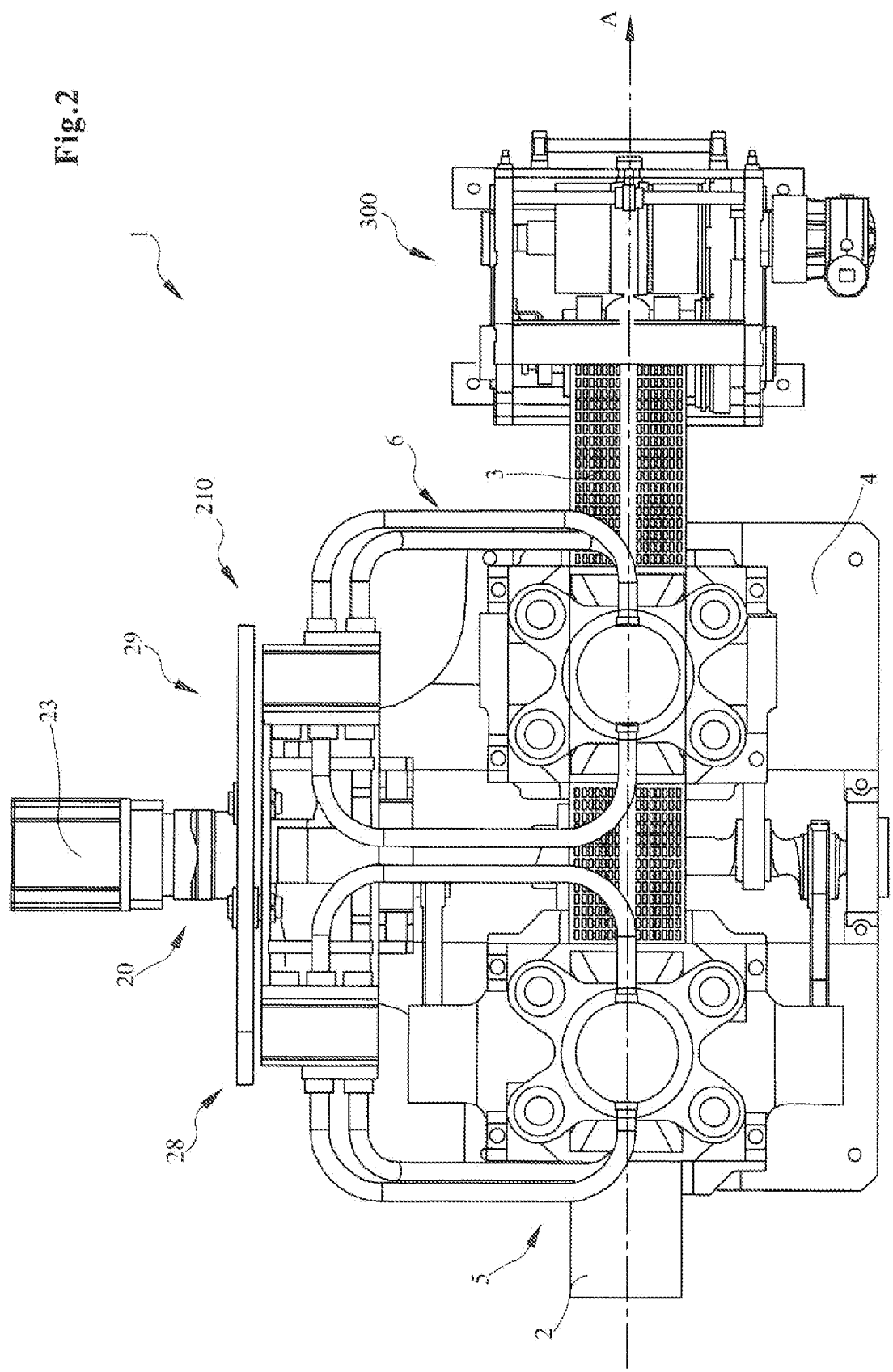
FIG. 2 shows a view from above of the machine of FIG. 1.
Figure 4:
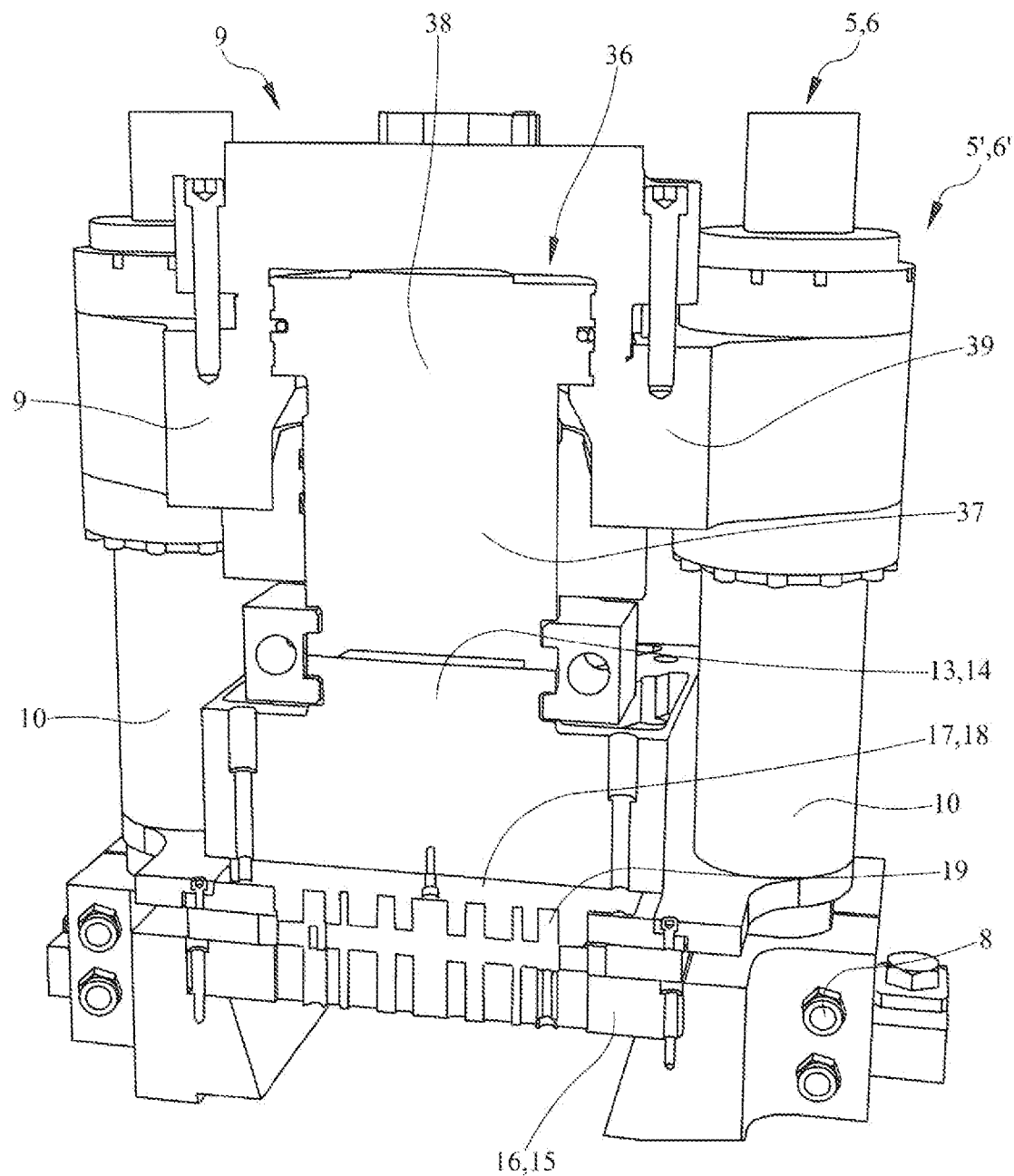
FIG. 4 shows a section view of the pressing tower of FIG. 3 carried out along a middle vertical plane.
Figure 5:
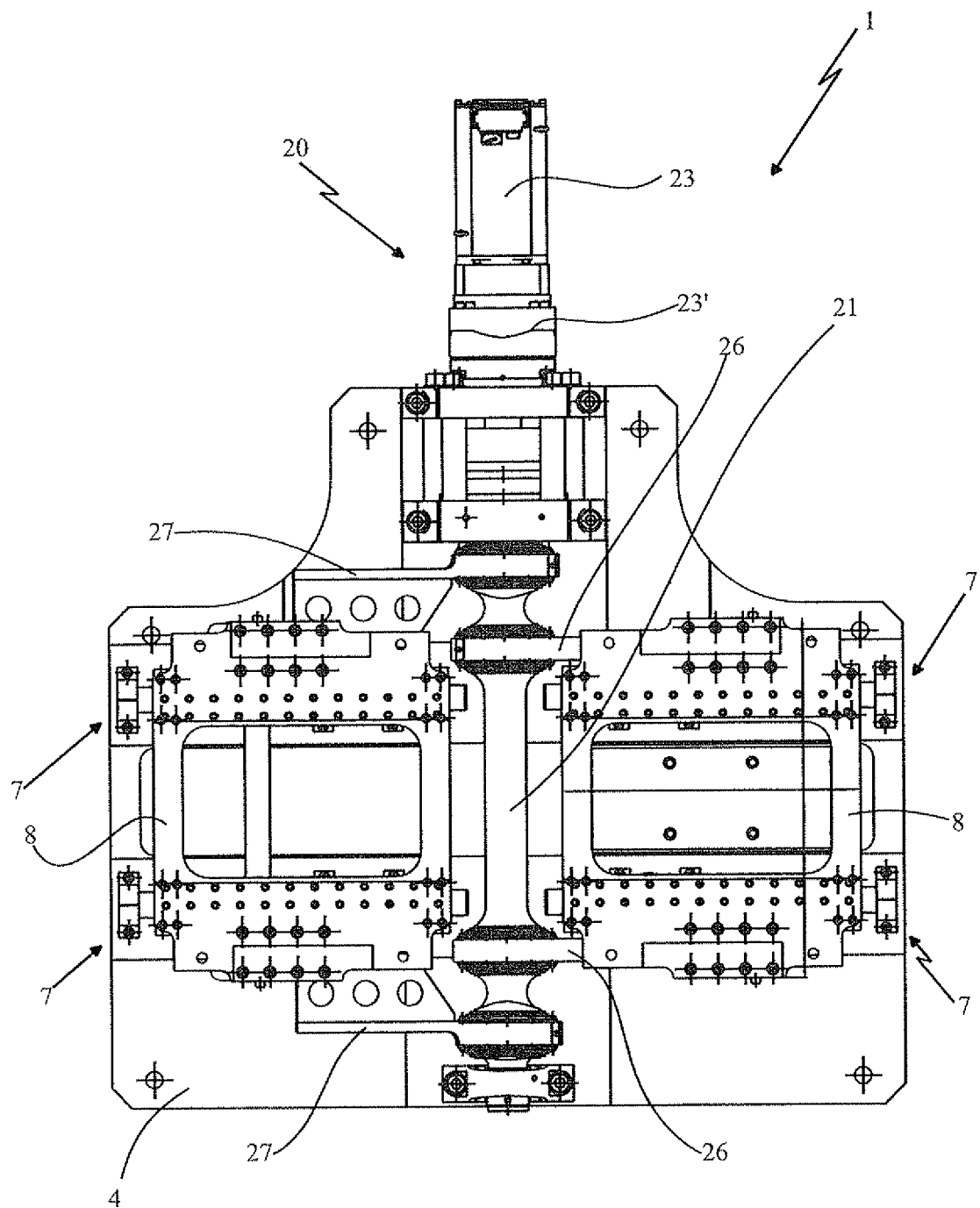
FIG. 5 shows a view from above of the machine of FIG. 1 with some parts removed to better highlight others.
Figure 6:
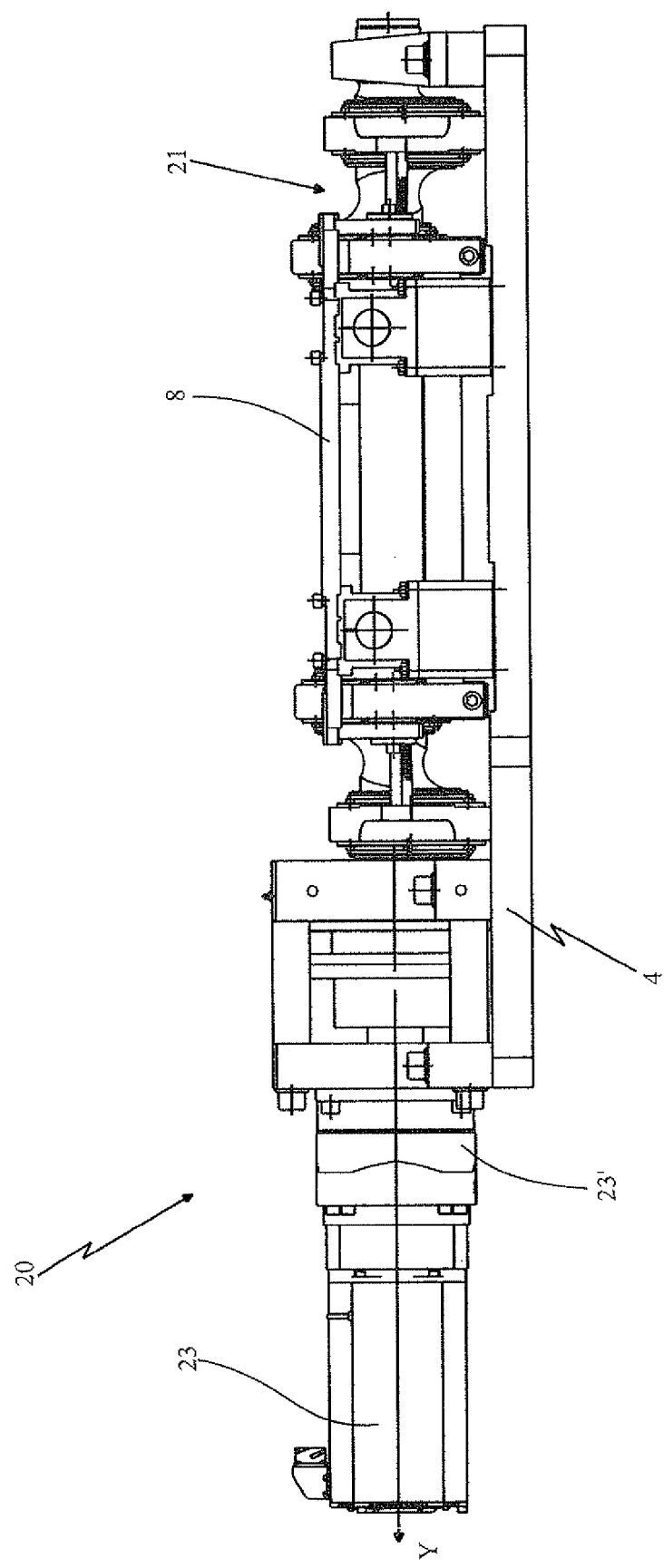
FIG. 6 shows the machine part of FIG. 5 in a side view.

With reference to the attached drawings, the grid forming machine for making plates of electric storage cells object of the present invention has been wholly indicated with 1. It is operatively supplied continuously and at constant speed with a continuous lead band 2, advantageously obtained in one same production line, through a melting unit for continuously forming the lead band, arranged upstream of the grid forming machine 1. The machine 1 object of the present invention in output produces a continuous lead grid 3, which is treated through a traction group, a levelling group and a lug shearing group (not illustrated in the attached figures because they are of the per se known type), for example foreseen on a single machine arranged downstream of the machine in object and in the same production line.

The scrap produced by the grid forming machine 1, as well as that produced by the lug shearing machine, can advantageously be sent directly to the lead melting unit allowing its simple management and quick reuse.

Hereafter, we shall in particular refer to an example embodiment concerning a forming machine 1 for a continuous lead band 2 for making plates for electric storage cells, with it nevertheless being understood that the material that makes up the band 2 can be of any alloy suitable for being used to build electric storage cells.

With particular reference to the attached FIGS. 1-8, the machine 1 comprises a support structure 4, intended to be fixed to the ground, which has been given as an example in the figures with a metal plate, but it can of course be replaced by a framework or by many separate part, resting individually on the ground, or even by a cement foundation or by other support structures suitable for bearing the loads of the different parts, specified hereafter, of the machine 1 object of the invention.

The latter comprises a first pressing tower 5 and a second pressing tower 6, both mounted on the support structure 4 and operatively active on the continuous lead band 2 that advances in succession through them.

More clearly, and as will be specified more clearly hereafter, the band 2 enters into the first tower 5 where it undergoes one or more punching operations aimed at causing a partial formation of the continuous grid 3 and then, once it has come out from the first tower 5, it enters into the second 6, aligned with the first 5 along the direction of forward movement X, where it once again undergoes one or more punching operations aimed at completing the forming of the continuous grid 3.

The first and the second pressing tower 5, 6 are equipped with respective frameworks 5', 6' mounted aligned on the support structure 4 along the direction of forward movement X.

In greater detail, the two pressing towers 5, 6 are mounted on the support structure 4 through guide means 7 that allow it to slide together and apart along the aforementioned direction of forward movement X of the band 2.

The framework 5', 6' of each tower 5, 6 is formed from a base 8 and from a central body 9 supported on the 8 by support columns 10.

The guide means 7 of each pressing tower 5, 6, are advantageously obtained through a pair of slides 11, fixed to the framework 5', 6', and in particular under the aforementioned base 8, and slidably engaged in rails 12 fixed on the support structure 4, parallel to the direction of forward movement X of the band 2.

The first and the second pressing tower 5, 6 are also respectively equipped with a first linear actuator 13 and with a second linear actuator 14 as well as with a first matrix 15 and with a second matrix 16.

In greater detail, each matrix 15, 16 is fixed onto the framework 5', 6' of the respective tower 5, 6 above the base 8 and below the corresponding linear actuator 13, 14.

Each actuator 13, 14 is mounted in the central body 9 of the framework 5', 6' of the respective tower 5, 6 and lowerly supports a press (indicated hereafter and in the attached figures as first press 17 and second press 18) facing the respective matrix 15, 16 with which it defines a corresponding incision area (i.e. a first and a second incision area).

Operatively, the first and the second press 17, 18 are moved by the respective linear actuators 13, 14 to move cyclically and alternatively between a raised position, in which they do not interfere with the continuous band 2, and a lowered position in which, coupling respectively with the first and the second matrix 15, 16, in the aforementioned first and second incision area, cut the continuous band 2 forming it in the form of a continuous grid 3.

In greater detail, each press 17, 18 is provided with a plurality of teeth that cut a section 2' of band 2 that advances, inserting into corresponding recesses formed in the corresponding matrix 15, 16 arranged at the bottom.

In this way, the well-known continuous lead mesh 3 is made, the size of the frame of which depends on the size of the teeth.

Advantageously, each pressing tower 5, 6 is provided with a piece-removing plate 19, arranged between the press 17, 18 and the corresponding matrix 15, 16 to facilitate the extraction of the teeth from the lead band 2.

The piece-removing plate 19 is advantageously fixed and adjusted remotely from the matrix 15, 16 to guide the band 2 that advances in the two incision areas.

Preferably, each section 2' of the band 2 is subject to many punching operations carried out in succession by different parts of the first and second press 17, 18 of the respective pressing towers 5, 6. Advantageously, each press 17, 18 is indeed made with many parts aligned along the direction of forward movement of the band 2, each able, with its teeth, to cut the same section 2' of continuous band 2 advancing in the incision area in a different way.

The forming of the continuous grid 3 in many punching operations facilitates the correct and precise incision and extraction of the teeth of the press respectively into a from the continuous band 2. Of course, the punching operations can be foreseen wholly or in part on a single pressing tower 5, 6, assigning the action of one of the two presses 17, 18 or just a part of the two presses 17, 18 to other finishing operations of the continuous grid 3, like, for example, to pressing operations.

Figure 9:
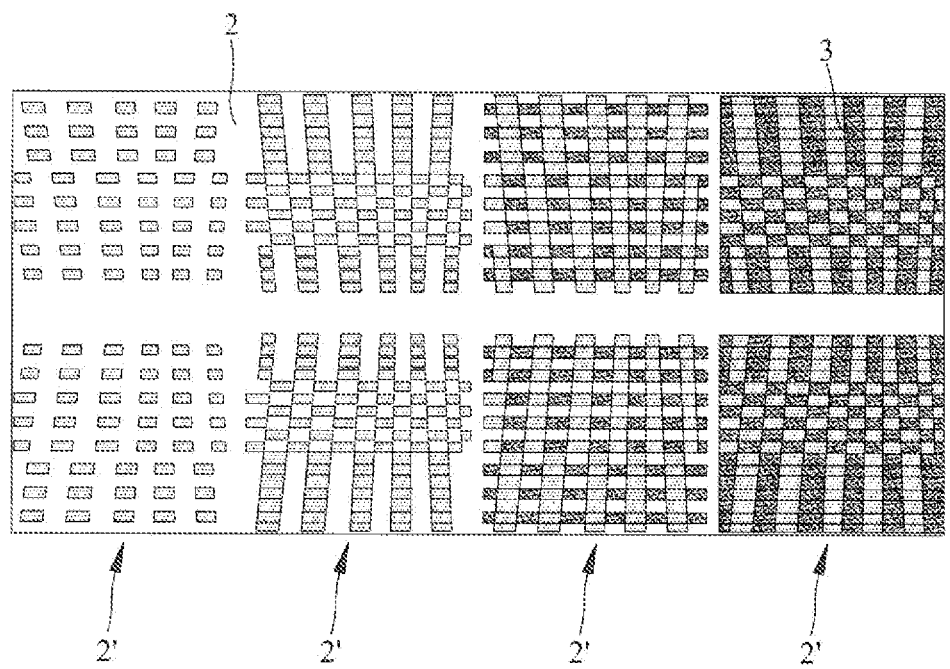
FIG. 9 shows a detail relative to a lead band subjected to four punching steps by the machine object of the present invention.
Figure 10:
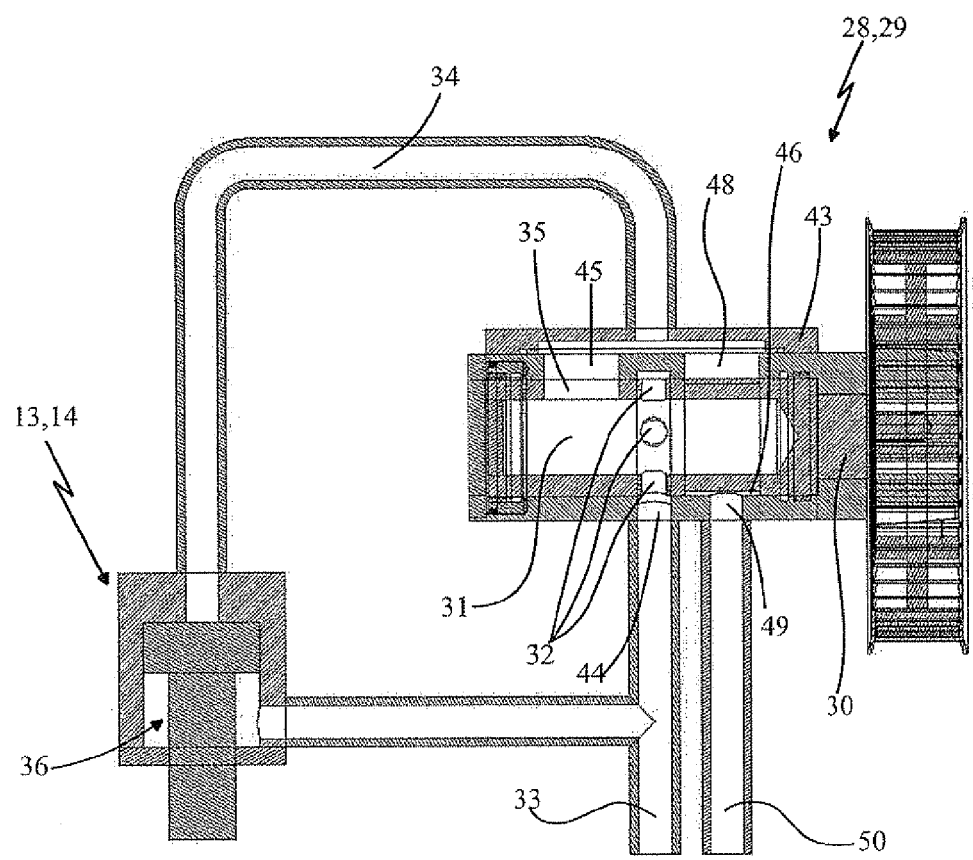
FIG. 10 schematically shows a detail of the machine object of the present invention relative to a part of its oil-hydraulic unit.

In accordance with the example embodiment illustrated in FIG. 9, the continuous grid 3 is obtained through 4 distinct pressing operations carried out by two distinct parts of each of the two presses 17, 18 of the two pressing towers 5, 6.

According to the idea forming the basis of the present invention, the machine 1 comprises moving means 20, which are mounted on the support structure 4 and act on the pressing towers 5, 6 to slidably move them along the direction of forward movement X with a back-and-forth cyclical stroke equipped with at least one operative section, in which the towers 5, 6 maintain substantially the same speed as that of forward movement of the continuous band 2 to allow its correct incision, in such a section, by the teeth of the relative press 17, 18 without a significant relative horizontal sliding movement with the band 2 that advances.

As indicated earlier, the band advances through the incision areas along the direction of forward movement X with substantially constant speed ensured by the supply and traction groups quoted earlier and arranged upstream of the machine 1 object of the present invention.

There are also actuation means 210 able to cyclically and alternatingly control the first and the second linear actuator 13, 14 to move the first and the second press 17, 18, from the raised position to the lowered position, at the operative section of the cyclical stroke of the corresponding first and second pressing tower 5, 6.

More clearly, the actuation means 210 control the descent of the presses 17, 18 when they have, through the moving means 20, reached the same speed as the advancing band 2.

The moving means 20 move the two pressing towers 5, 6 horizontally with the aforementioned back-and-forth stroke according to a law of motion equipped, for at least the aforementioned operative section, with a speed, in the direction of forward movement X, substantially equal to the speed of the band 2, to allow the presses 17, 18 to advance substantially in synchrony with the band 2, and to cut it descending vertically onto it with a movement Z perpendicular to the direction of the forward movement X without substantial relative horizontal sliding with the advancing band 2.

The moving means 20, suitable for moving the pressing towers 5, 6 with the aforementioned law of motion, can be obtained with just mechanical means or, in a more precise and versatile manner, also with the help of electronic means.

In the case of use of just mechanical means, the moving means can for example comprise an articulated parallelogram structure, moved by an eccentric set in rotation by a motorised shaft, and able to carry out a stroke equipped with a small vertical component and with a horizontal component that, transmitted to said first and second pressing tower, allows them to move with an operative stroke having substantially constant speed for all of the aforementioned operative section.

Such mechanical means allow the speed of the pressing towers 5, 6 for their operative section, to be approximated to the speed of forward movement of the band 2, so that when the presses 17, 18 begin to cut the band 2 following it with substantially equal speed of forward movement, the relative sliding is minimal and does not lead to jamming of the teeth or undesired deformations of the band 2. The same relative sliding is minimal for the entire operative section and until the teeth come out from the band 2. The man skilled in the art will be able to design numerous different mechanical configurations of the moving means 20 capable of moving the pressing towers 5, 6 with speeds that differ by a tolerance margin from the speed of the band 2, able not to significantly deform the final continuous grid 3 and to allow the teeth of the presses 17, 18 to come out without tearing and difficulty from the band 2.

In accordance with a preferred embodiment of the present invention, illustrated in the attached figures, the moving means 20 comprise a crankshaft 21, rotatably supported at the ends through bearings on the support structure 4, set in rotation by a first motor 23 with gearmotor 23', and equipped with at least one first eccentric 24 and with at least one second eccentric 25, respectively connected through at least corresponding first connecting rod 26 and second connecting rod 27, to the first and to the second pressing tower 5, 6.

Preferably, the crankshaft 21 extends with a development axis Y transversal to the direction of forward movement X of the band 2 and it is provided with a central portion 21' at the margins of which two first eccentrics 24 extend, connected through a first pair of connecting rods 26 to the base 8 of the framework 5' of the second pressing tower 6, and with two end portions 21" from which two second eccentrics 25 extend, connected through a second pair of connecting rods 27 to the base 8 of the framework 6' of the first pressing tower 6.

The aforementioned connecting rods 26, 27 are hinged at one end to the base 8 of the framework 5', 6' of the relative pressing tower 5, 6 and are provided, at the other end, with an eyelet developing around the corresponding eccentric 24, 25 of the crankshaft 21, through sliding means.

The two first eccentrics 24 of the crankshaft 21 extend in the radial direction in diametrically opposite ways with respect to those of the two second eccentrics 25, to cyclically actuate the pressing towers 5, 6 together and apart from one another, compensating for the forces that they transmit to the support structure 4 during their operating cycle.

In accordance with a preferred embodiment of the present invention, the moving means 20 comprise an electronic control unit, which controls the first motor 23 of the crankshaft 21 with a speed suitable for determining, through the connecting rods 26, 27, horizontal movements of the pressing towers 5, 6 equal to the speed of forward movement of the band 2 in the corresponding operative sections.

Thanks to such an electronic control unit, the first motor 23 accelerates and decelerates in every cycle of the operative stroke, to keep the speed of horizontal movement constant as the pressing towers 5 and 6 move towards one another and apart in the aforementioned operative section in which the incision of the band 2 occurs. In greater detail, during the coming together of the towers 5, 6 the first pressing tower 5 will have a speed of forward movement in the direction of forward movement of the band 2 (and therefore will lower with its first press 17 to cut the band 2) whereas during the movement apart of the towers 5, 6 it will be the second pressing tower 6 that has a speed of forward movement in the direction of forward movement of the band 2 (and therefore will lower with its second press 18 to cut the band 2).

Otherwise, the electronic control unit, can control the speed of forward movement of the band 2, controlling its relative accelerations and decelerations through the control of the relative forward movement motor, in every cycle of the operative stroke of the pressing towers 5, according to the position taken up by the same pressing towers 5 and 6. The position of the latter is for this purpose preferably controlled through the signals received by the aforementioned first motor 23 of the crankshaft 21.

In this case therefore, the electronic control unit controls the speed of forward movement of the band with the same speed of forward movement as the horizontal speed of forward movement of the pressing towers in the corresponding operative sections.

Advantageously, the first and the second actuator 13, 14 respectively consist of a first and a second hydraulic jack and correspondingly the actuation means 210 comprise an oil-hydraulic unit able to send pressurised oil alternatively to the first and to the second hydraulic jack at the operative section of the cyclical stroke of the corresponding first and second pressing tower 5, 6.

In greater detail, the oil-hydraulic unit comprises a pressurised fluid source, for example consisting of a tank connected to a pump, which is connected through oil distribution valves to the two jacks 13, 14 to alternatively and cyclically supply them as specified above.

Advantageously, the distribution of oil of the oil-hydraulic unit to the two jacks 13, 14 is obtained through at least one first rotary valve 28 and at least one second rotary valve 29, respectively connected to the first and to the second hydraulic jack 13, 14.

In greater detail, in accordance with a preferred embodiment of the invention, each of the first and second rotary valves 28, 29, comprises a rotary drum 30 defining a pressurised chamber 31 inside it, constantly connected to the pressurised oil source through a plurality of first ports 32, which are foreseen circumferentially on the cylindrical wall of the rotary drum 30 and are in communication with an end of a supply duct 33 connected at the other end to the tank of pressurised oil. Given that the drum 30 rotates and the supply duct 33 of the pressurised oil is on the other hand immobile, seals are foreseen between such two components, as specified more clearly hereafter.

The pressurised chambers 31 of the first and second rotary valve 28, 29 are also cyclically and alternatingly in communication with the respective first or second hydraulic jack 13, 14, at the operative section of the cyclical stroke of the corresponding first or second pressing tower 5, 6, to control the corresponding first or second press 17, 18 to cut the band 2 (thus when the speed of the press is substantially equal to that of forward movement of the band 2).

The cyclical communication between the pressurised chamber 31 and the respective hydraulic jack 13, 14 is ensured for each jack by a first delivery duct 34 that is arranged cyclically in communication with the pressurised chamber 31 by a second port 35, also foreseen on the cylindrical wall of the rotary drum 30.

Each hydraulic jack 13, 14 comprises a piston 36 provided with a stem 37 carrying fixed, at one of its ends, the corresponding press 17, 18 and, at the other end, a widened head 38. The latter sealably slides in the sleeve 39 of the jack 13, 14 separating it in two parts. A first part 40 of the sleeve 39, arranged beyond the head 38, is connected to the first delivery duct 34. The second part 41 of the sleeve, arranged around the stem 37, is connected to a second delivery duct 42, which is permanently in communication with the tank of pressurised oil.

The first and the second delivery duct 34, 42 cyclically actuate the relative piston 36, to move in lowered position when the pressurised chamber 31 is connected through the second port 35 to the first part 40 of the sleeve 39 through the first delivery duct 34 generating a pressure difference on the two faces of the head 38 of the corresponding piston 36.

In such a circumstance, indeed, the head 38 of the piston 36 is subjected on both of its faces to oil at equal pressure, but the face facing towards the second part 41 of the sleeve 39 has smaller dimensions than that facing towards the first part 40 (due to the bulk of the stem 37), so that a pressure difference is generated on the head 38 of the piston 39 that moves the latter in extension and therefore with the press 17, 18 fixed to the stem 37 to cut the continuous band 2.

In order to alternate the outward and return steps of the piston 36 and therefore to lower and raise the press 17, 18, the first part 40 of the sleeve 39 is cyclically and alternatingly placed in communication with the pressurised chamber 31, and with a discharge duct at lower pressure than that of the pressurised chamber 31 and connected to the return of the oil in the oil-hydraulic unit or entering the pump to be brought back into pressurised circulation in the tank.

The discharge duct, which relives pressure from the first part 40 of the sleeve 39 of the jack 13, 14, can advantageously be obtained (at least in the initial section) with the same first delivery duct 34, crossed by the oil in the opposite direction, when the first part 40 of the sleeve 39 is no longer connected to the pressurised chamber 31 because, for example, the second port 35 is closed as will be made clearer hereafter.

The rotary drum 30 is rotatably sealably inserted in a casing 43, equipped with a first opening 44 connected to the supply duct 33 of the pressurised fluid and in communication with the pressurised chamber 31 of the rotary drum 30 through the aforementioned plurality of first perimeter ports 32.

The casing 43 is equipped with a second opening 45 connected to the first delivery duct 34 and cyclically in communication with the pressurised chamber 31 of the rotary drum 30 through the second port 35, when the latter faces the second opening 45 in the rotation of the rotary drum 30. This occurs when the tower 5, 6 moves at substantially the same speed as that of the band 2 at the operative section of its stroke so that the first delivery duct 34 carries pressurised oil to the piston 36 making it lower and thus causing the incision of the band 2 by the press 17, 18 fixed to the piston 36.

The downward actuation of the piston 36 is advantageously sudden to avoid deformations of the lead band 2 or difficulties in extracting the teeth of the press 17, 18. For this purpose, the second port 35 formed on the cylindrical wall of the rotary drum 30 is quite wide to quickly bring pressurised oil to the sleeve 39 of the hydraulic jack 13, 14. However, since the incision of the press 17, 18 has to occur quickly for better forming of the continuous grid 3, the second port 35 advantageously has a prevailing extension on its cylindrical wall in the axial direction of the rotary drum 30. This makes it possible for them, with a minimal rotation of the rotary drum 30, to face one another with a substantial area at the second opening of the casing 43, allowing a substantial flow rate of fluid to transit from the pressurised chamber 31 to the first delivery duct 34, determining the sudden lowering of the press 17, 18.

Advantageously, in accordance with a preferred embodiment of the present invention, the discharge of the sleeve 39 of the hydraulic jacks 13, 14 occurs cyclically thanks to the same first and second rotary valves 28, 29.

Figure 11:
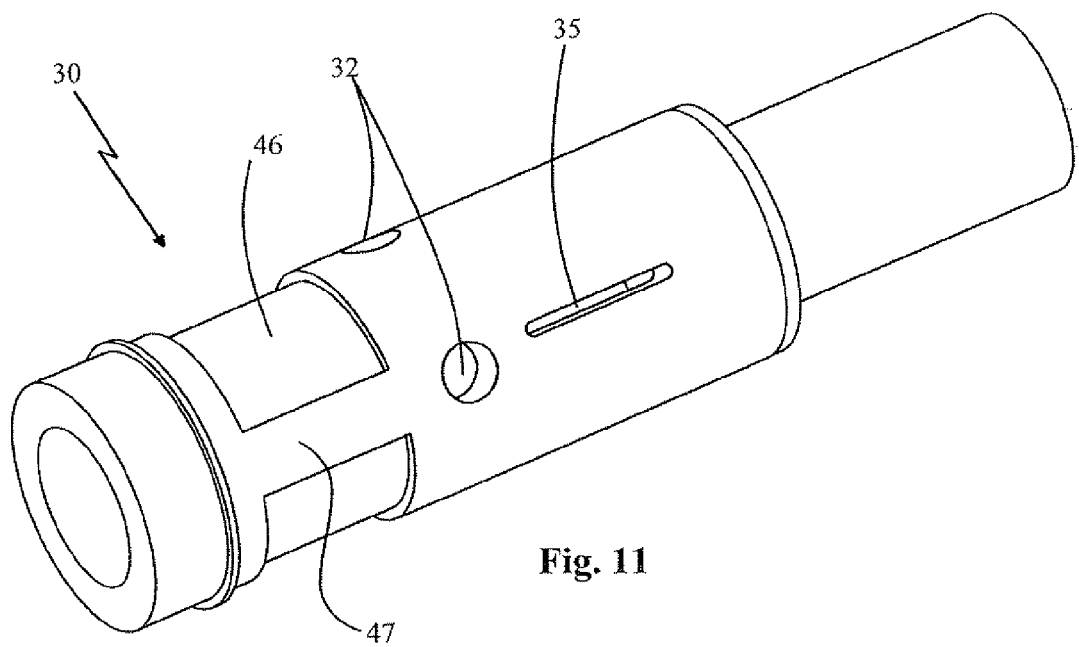
FIG. 11 shows a detail of the machine object of the present invention, relative to a rotary drum of a rotary valve.
Figure 12:
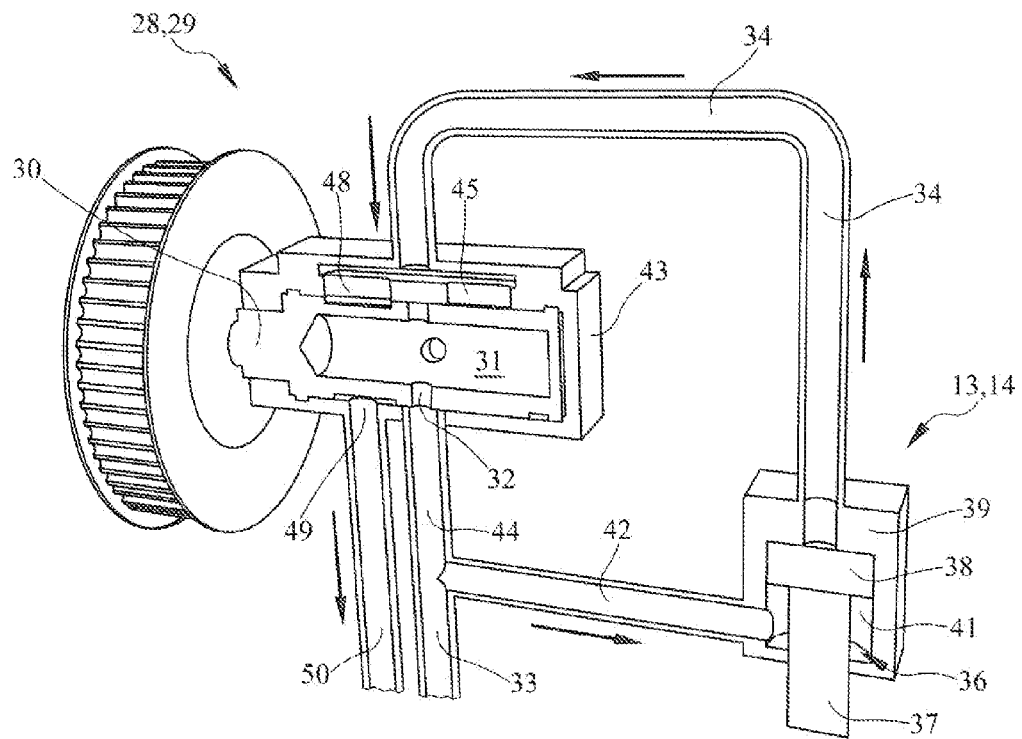
FIGS. 12, 13 show the part of the oil-hydraulic unit of FIG. 10 in two different operating conditions.
Figure 13:
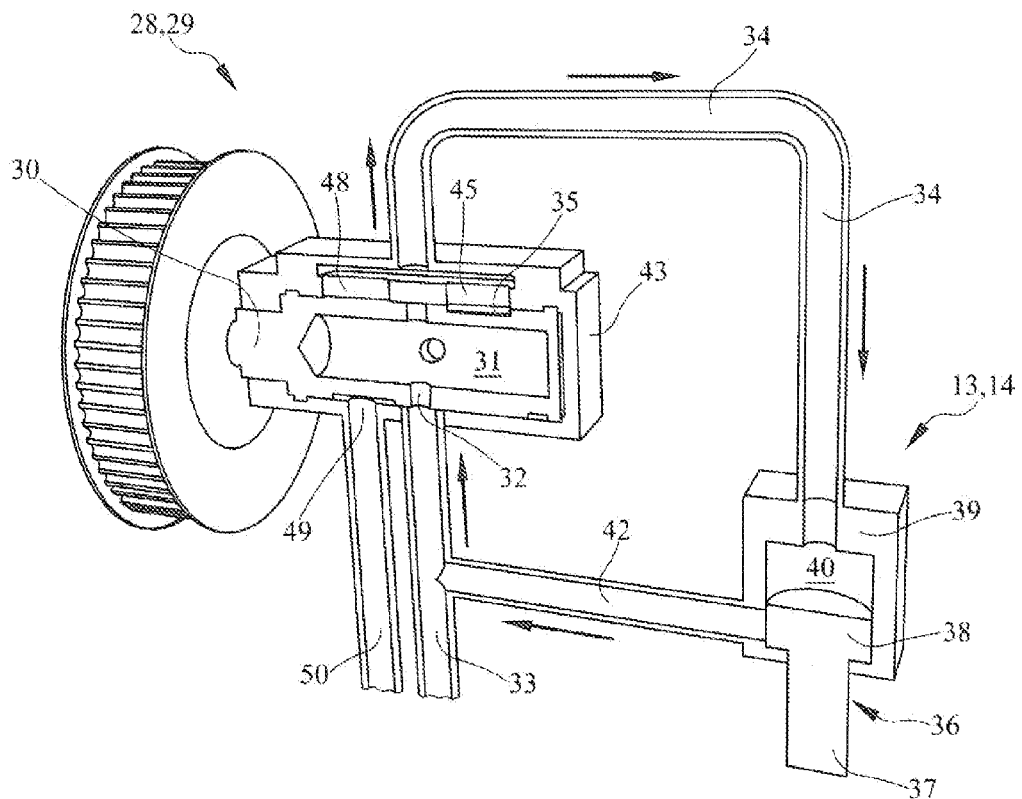

In greater detail, the rotary drum 30 of the two rotary valves 28, 29 is equipped on its cylindrical wall with an annular groove 46 facing outwards, which is interrupted by a projecting section 47 (see FIG. 11) intended to make a seal on the inner surface of the casing 43.

The rotary drum 30 of the two rotary valves 28, 29 selectively and cyclically places the discharge duct of the sleeve of the corresponding hydraulic jack 13, 14 in communication with the low pressure return of the hydraulic system through the aforementioned annular groove 46 according to the angular position taken up by the rotary drum 30. As will be described in greater detail hereafter, the discharge duct, advantageously partially obtained, as considered earlier, with the same first delivery duct 34 crossed in the opposite direction by the oil, is divided into two sections selectively connected together through the aforementioned annular groove 46. For this purpose two further openings are foreseen on the casing 43 at the position of the annular groove 46, at least one of which is able to be closed or opened by the projecting section 47, respectively when the second port 35 of the drum 30 is or is not in communication with the first delivery duct 34.

In greater detail, the casing 43 is provided with a third opening 48, connected to a first section of the discharge duct, in communication with the first part 40 of the sleeve 39 and consisting, as stated, preferably of the first discharge duct 34, and of a fourth opening 49, connected to a second section 50 of the discharge duct in communication with the low-pressure return duct of the fluid of the oil-hydraulic unit.

Operatively, the first and the second section of the discharge duct 34, 50 are arranged cyclically in communication with each other through the aforementioned groove 46 when the projecting section 47 does not block the third opening 48 (or the fourth in a different embodiment that is not represented).

In greater detail, the projecting section 47 blocks the third opening 48, when the pressurised chamber 31 is connected through the second port 35 to the first part 40 of the sleeve 39 through the first delivery duct 34 (consisting of the same first section of the discharge duct but with the direction of travel of the oil reversed).

The annular groove 46 is thus interrupted or not in the passage of the oil operatively in a synchronised manner with the opening of the second port 35. The annular groove 46, the projecting section 47, the casing 43 with its third and fourth opening therefore make a mechanically synchronised valve. Although the one presented should be considered to be the preferred embodiment (allowing speed of actuation and perfect synchrony) of the valve, the valve can nevertheless be made in other embodiments (even with electronic synchronization) without for this reason departing from the scope of protection of the present document.

The machine 1 according to the invention also comprises first coupling means suitable for kinematically synchronising the rotation of the rotary rollers 30 of the two rotary valves 28, 29 so as to cyclically and alternatingly control the pistons 36 of the two hydraulic jacks 13, 14.

In accordance with the preferred embodiment illustrated in the attached figures, such first coupling means comprise two pulleys 51 each fitted on the shaft of the respective rotary drum 30, and a belt 52 mounted looped over the two pulleys to transmit an identical rotation motion to the two rotary drums 30.

The belt 52 is also preferably wound over the pinion of a second motor, preferably of the brushless type, controlled by the electronic control unit to rotate in synchrony with the operative stroke of the pressing towers 5, 6 to control the incision of the band 2 at the operative section of the same towers 5, 6, i.e. when the speed of movement of the latter is substantially the same as the speed of forward movement of the band 2.

In this case, the electronic control unit also acts as a second coupling means to synchronise the rotation of the rotary rollers 30 of the two rotary valves 5, 6 with the cyclical stroke of the respective pressing towers 5, 6, as stated so as to actuate the pistons 36 to move with the presses 17, 18 in the lowered position, cyclically connecting the pressurised chamber 31 of the rotary valves 28, 29 to the first part 40 of the sleeve 39, at the operative section of the cyclical stroke of the respective pressing towers 5, 6. The two motors for moving the towers and the valves are for this purpose advantageously both of the brushless type, to allow easy control in synchrony by the aforementioned electronic control unit.

The second coupling means can however be of the mechanical type, foreseeing kinematisms capable of constraining, in a synchronised manner, the rotation of the rotary rollers 30 with the movements of the towers 5, 6.

In accordance with a further advantageous characteristic of the present invention, the central body 9 of the framework 5', 6' of each tower 5, 6 is able to be lifted on its base 8 to allow normal maintenance or the replacement of the presses 17, 18 with others having different configuration. For this purpose, the support columns 10, quoted earlier, for supporting the central body 9 of the framework 5', 6' on its base 8, consist of linear actuators that can be actuated to lift to allow access to the presses 17, 18.

By acting on the electronic control unit it is possible, once the press 17, 18 has been replaced and/or the type of band 2 used has been modified (for example using bands of different thickness) to modify the duration of the incision step or the time of the operative stroke of the pressing towers 5, 6 to optimise the forming of the band of continuous grid 3 maintaining the synchrony between the movement of the towers 5, 6 and the actuation of the presses 17, 18 between the two operative positions.

The finding thus conceived therefore achieves the preset purposes.

Of course, it can, in its practical embodiment, also take up different forms and configurations from the one illustrated above, without for this reason departing from the present scope of protection.

Moreover, all of the details can be replaced with technically equivalent elements and the sizes, shapes and materials used can be whatever according to requirements.

The invention claimed is:

1. Grid forming machine for making plates of electric storage cells, characterised in that it comprises:
   a support structure;
   a first pressing tower and a second pressing tower mounted on said support structure, operatively active on a continuous lead band that advances with a substantially constant speed in succession through said first and second pressing tower, aligned along the direction of forward movement of said band; said first and second pressing tower respectively comprising:
      a first and a second framework slidably mounted along said direction of forward movement on said support structure;
      a first and a second linear actuator respectively mounted on said first and second framework and respectively supporting a first and a second press;
   a first and a second matrix respectively fixed on said first and a second framework below said first and second linear actuator to define a first and a second incision area together with them;
   said first and second press being moved cyclically and alternatingly by said linear actuators to move between at least one raised position, in which they do not interfere with said continuous band and a lowered position in which, coupling with said first and second matrix, they cut into said band forming it in the shape of a continuous grid in said first and second incision area;
   moving means mounted on said support structure and acting on said pressing towers to move them in a sliding fashion together and apart from one another along said direction of forward movement with a back-and-forth cyclical stroke equipped with at least one operative section with substantially the same speed as that of forward movement of said continuous band;
   actuation means able to cyclically and alternatingly control said first and second linear actuator to respectively move said first and second press from said raised position to said lowered position at the operative section of the cyclical stroke of said corresponding first and second pressing tower.

2. Machine according to claim 1, characterised in that said moving means comprise a crankshaft set in rotation by a first motor equipped with at least one first and second eccentric, respectively connected, through at least one corresponding first and second connecting rod, to said first and second pressing tower.

3. Machine according to claim 2, characterised in that said first and second eccentric are diametrically opposite with respect to the axis of said crankshaft, to cyclically actuate said pressing towers towards and away from one another compensating the forces transmitted by them to said support structure.

4. Machine according to claim 1, characterised in that the first and second framework of said first and second pressing tower are each slidably mounted on said support structure through at least one slide able to slide in at least one corresponding rail wherein the at least one rail is fixed to the support structure and the side is fixed to said first or second framework.

5. Machine according to any one of the previous claim claim 1, characterised in that said first and second linear actuator are respectively a first and a second hydraulic jack and said actuation means comprise an oil-hydraulic unit able to send pressurised oil alternatively to said first and to said second hydraulic jack at the operative section of the cyclical stroke of said corresponding first and second pressing tower.

6. Machine according to claim 5, characterised in that said oil-hydraulic unit comprises a pressurised fluid source connected through at least one first rotary valve and at least one second rotary valve to said first and second hydraulic jack.

7. Machine according to claim 6, characterised in that each of said first and second rotary valve comprises a rotary drum defining a pressurised chamber inside it, constantly connected to said pressurised oil source through a supply duct in communication with said pressurised chamber through at least one first port on said rotary drum, and cyclically in communication at the operative section of the cyclical stroke of the corresponding first or second pressing tower, with said respective first or second hydraulic jack to control the corresponding first or second press to cut the band, through a corresponding first delivery duct cyclically in communication with said pressurised chamber through at least one second port on said rotary drum.

8. Machine according to claim 7, characterised in that each of said jacks comprises a piston provided with a stem equipped with a widened head, which sealably slides in a sleeve of said jack separating it into two parts, a first of which, arranged beyond the head, is connected to said first delivery duct, and a second of which, arranged around said stem, is connected to a second delivery duct permanently in communication with said oil source; said first and second delivery ducts cyclically actuating said piston, to move into said lowered position when said pressurised chamber is connected through said second port to said first part of said sleeve through said first delivery duct generating a pressure difference on the two faces of the head of said corresponding piston.

9. Machine according to claim 8, characterised in that the first part of said sleeve is cyclically alternatingly in communication with said pressurised chamber, and with a discharge duct at a lower pressure than said pressurised chamber, for the return of the fluid into the oil-hydraulic unit.

10. Machine according to claim 9, characterised in that said discharge duct is at least in part obtained with said first delivery duct crossed by said fluid in the opposite direction.

11. Machine according to claim 7, characterised in that said rotary drum is rotatably sealably inserted into a casing, equipped with a first opening connected to said supply duct of the pressurised fluid and cyclically in communication with the pressurised chamber of said rotary drum through a plurality of first perimeter ports.

12. Machine according to claim 11, characterised in that said casing is equipped with a second opening connected to said first delivery duct and cyclically in communication with the pressurised chamber of said rotary drum through said second port, when the latter is facing towards said second opening in the rotation of said rotary drum.

13. Machine according to claim 12, characterised in that said second port has a prevailing extension in the axial direction of said rotary drum to allow a substantial fluid flow rate from said pressurised chamber to said first delivery duct with a minimum rotation of said rotary drum.

14. Machine according to claim 9, characterised in that said rotary drum is rotatably sealably inserted in a casing, and it is equipped with an annular groove interrupted by a projecting section intended to make a seal on said casing, the latter being provided with a third opening connected to a first section of said discharge duct in communication with the first part of said sleeve, and with a fourth opening connected to a second section of said discharge duct in communication with the return duct of the fluid of said oil-hydraulic unit;

said first and second section of said discharge duct being cyclically in communication with one another through said groove when said projecting section does not block said third opening, said projecting section blocking said third opening when said pressurised chamber is connected through said second port to the first part of said sleeve through said first delivery duct.

15. Machine according to claim 8, characterised in that it comprises first coupling means, in particular for mechanical transmission, suitable for kinematically synchronizing the rotation of the rotary rollers of said two rotary valves with each other, to cyclically and alternatingly control the pistons of said first and second hydraulic jack.

16. Machine according to claim 8, characterised in that it comprises second coupling means, in particular for mechanical transmission, suitable for synchronizing the rotation of the rotary rollers of said two rotary valves with the cyclical stroke of said respective towers to actuate said pistons to move into said lowered position, cyclically connecting the pressurised chamber of said rotary valves to the first part of said sleeve, at the operative section of the cyclical stroke of said respective pressing towers.

17. Machine according to claim 2, characterised in that said moving means comprise an electronic control unit that drives the first motor of the crankshaft with a speed, suitable for determining horizontal movements of said pressing towers through said connecting rods, equal to the speed of forward movement of said band in the corresponding operative sections.

18. Machine according to claim 2, characterised in that said moving means comprise an electronic control unit that drives the speed of forward movement of said band with a speed of forward movement equal to the horizontal speed of forward movement of said pressing towers in the corresponding operative sections.

\* \* \* \* \*